(12) United States Patent
Capozio et al.

(10) Patent No.: US 8,125,380 B2
(45) Date of Patent: Feb. 28, 2012

(54) POSITION COMPUTING METHOD, RECEIVING APPARATUS AND NAVIGATION SATELLITE SYSTEM EMPLOYING THE METHOD

(75) Inventors: Piergiorgio Capozio, Milan (IT); Nicola Matteo Palella, Rivolta d'Adda (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 688 days.

(21) Appl. No.: 12/182,947

(22) Filed: Jul. 30, 2008

(65) Prior Publication Data

US 2010/0026568 A1   Feb. 4, 2010

(51) Int. Cl.
 *G01S 19/11* (2010.01)
(52) U.S. Cl. .................................. 342/357.48
(58) Field of Classification Search ... 342/357.2–357.78
 See application file for complete search history.

(56) References Cited

U.S. PATENT DOCUMENTS

7,541,975 B2 * 6/2009 Sever et al. .............. 342/357.48
2010/0138147 A1 * 6/2010 T'Siobbel ..................... 701/201
* cited by examiner

*Primary Examiner* — Thomas Tarcza
*Assistant Examiner* — Nga X Nguyen
(74) *Attorney, Agent, or Firm* — Seed IP Law Group PLLC (57) ABSTRACT

A position computing method computes a position of a receiver using a satellite navigation system. The method includes: bringing a satellite receiver in a dark region of the satellite system; bringing the receiver into a visible region of the satellite system outside the dark region; allocating to the dark region a darkness category chosen between at least two categories based on a dark region crossing time at which the receiver crosses between the dark region and the visible region; allocating a visibility class, chosen between at least two distinct classes, to the visibility region; and selecting one of first and second receiver position computing methods based on the class and the category allocated. The method further includes calculating a receiver position of the receiver by applying the selected computing method.

37 Claims, 9 Drawing Sheets

POSITION COMPUTING METHOD, RECEIVING APPARATUS AND NAVIGATION SATELLITE SYSTEM EMPLOYING THE METHOD

BACKGROUND

1. Technical Field

The present invention relates to the field of global navigation satellite systems.

2. Description of the Related Art

As it is known, in order to compute one's position, a GNNS (global navigation satellite system) receiver, for example a GPS (Global Positioning System), receives properly formatted electromagnetic signals transmitted by a constellation of satellites orbiting the earth.

GNNS receivers, which in ordinary operating conditions make use of a Kalman filter procedure in order to compute the user's position, are known.

A Kalman filter computes the current position by means of a weighted linear combination between a first term corresponding to the extrapolation of the position based exclusively on the prior knowledge and a second term which is the position computed just based on the current measures.

At starting-up, when the receiver is turned on, or for any reasons, when the whole past memory of the positioning software is to be reset, the computing procedure usually employed according to conventional methods is the Least Square algorithm. The Least Square algorithm is a one-shot algorithm because it computes the receiver position using a single set of instant measures without any other past information.

Referring to the user's positioning computing by a GNNS receiver, there are environmental conditions which make the positioning particularly difficult and have a high risk of error.

One of the most difficult scenarios is represented by a receiver which, for example, on board a car that has gone through a tunnel and is now coming out of the same. When the receiver is in a tunnel, usually signals from the satellites cannot get inside the tunnel so during this "black out" the receiver cannot compute its position.

On exiting the tunnel, when no measures are available for a short time or a long time, the receiver will supply the user with the new position. According to the known art, the position computing on exiting the tunnel is performed by criteria which do not offer satisfying reliability.

BRIEF SUMMARY

According to an embodiment, a position computing method of a satellite navigation system comprising:

bringing a satellite receiver in a dark region of the satellite system;

bringing the receiver into a visible region of the satellite system outside the dark region;

allocating the dark region to a darkness category chosen between at least two categories based on the dark region crossing time;

allocating a visibility class, chosen between at least two distinct classes to the visibility region;

selecting one method between a first and a second receiver position computing method based on a criterion which takes into account the class and the category allocated.

According to another aspect, a positioning computing module comprises a selection module capable of selecting the first or the second receiver position computing method based on a criterion which takes into account the class and the category allocated.

Further embodiments include a satellite receiving apparatus and a satellite system.

BRIEF DESCRIPTION OF THE SEVERAL VIEWS OF THE DRAWINGS

Further characteristics and advantages will be more apparent from the following description of a preferred embodiment and of its alternatives given as a way of an example with reference to the enclosed drawings in which.

DETAILED DESCRIPTION

Figure 1:
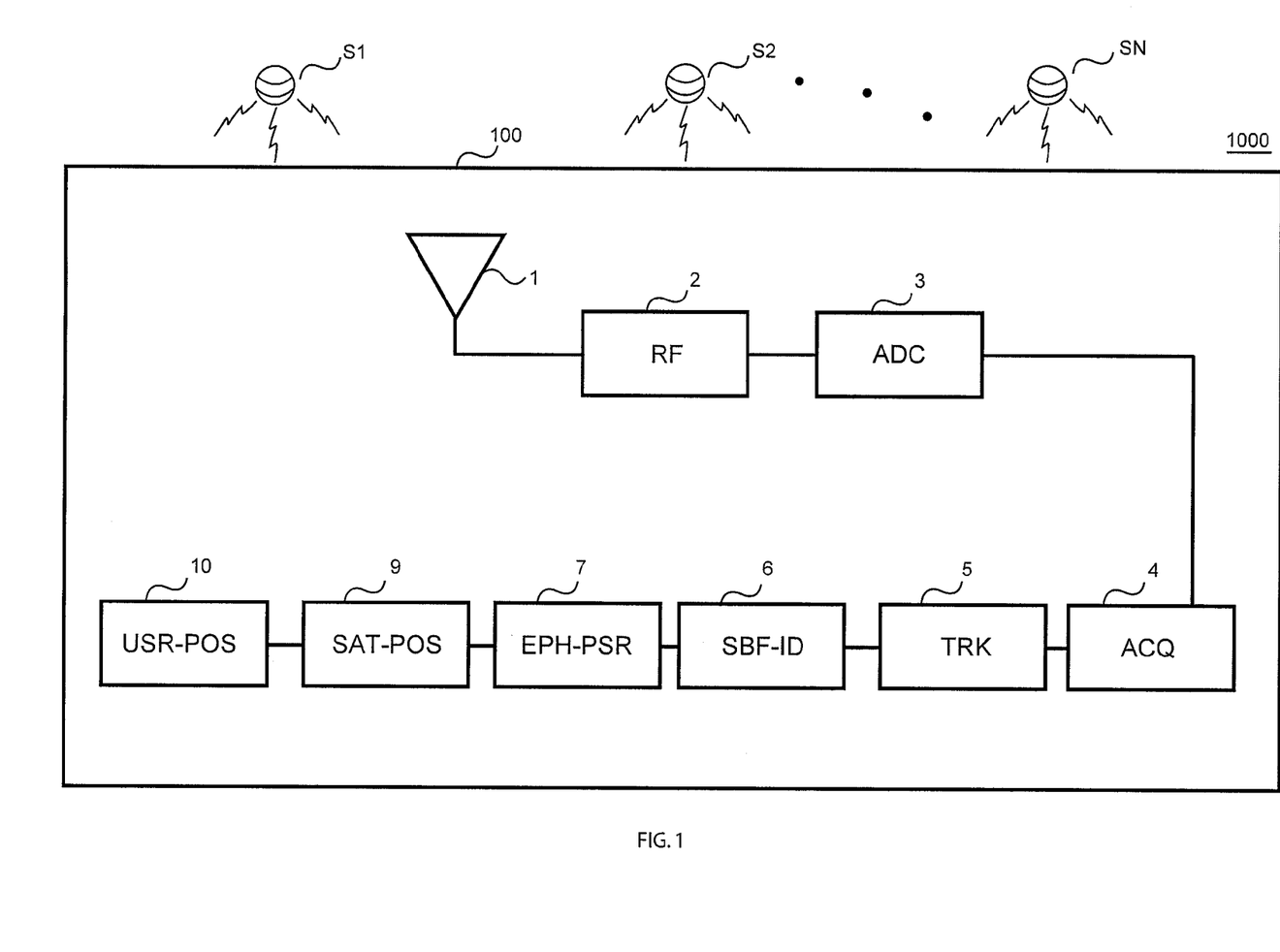
FIG. 1 schematically illustrates a global navigation satellite system according to an embodiment comprising a constellation of satellites and a receiving apparatus.

FIG. 1 schematically shows a GNSS system (global navigation satellite system) 1000 such as, for example the GPS System (Global Positioning System), the GLONASS System (Global'naya Navigatsionnaya Sputnikovaya Sistema), DORIS System (Doppler Orbitography and Radio-Positioning integrated by Satellites), Galileo System or other kinds of positioning systems based on satellites. The global navigation satellite system 1000 comprises a constellation of S1-SN Satellites and at least a receiving apparatus 100.

As an example, the receiving apparatus 100 comprises an antenna 1, a radio frequency stage (RF) 2, and an analog-digital converter (ADC) 3, implementable through hardware modules. The receiving apparatus 100 further comprises an acquisition module (ACQ) 4, a tracking module (TRK) 5, a sub-frame identification module (SBF ID) 6, an ephemeris processing and pseudo-range computing module (EPH-PSR) 7, a satellite position computing module (SAT-POS) 9 and a user's position computing module (USR-PS) 10.

For example the acquisition module 4 and the tracking module 5 can be implemented through hardware while the remaining modules from 6 to 10 can be implemented by means of respective software. The receiving apparatus 100 is provided with a central processing unit, memories (mass memory and/or work memory) and their interfaces (not shown in the figures) comprising a microprocessor or a microcontroller, for implementing the software modules.

Now, as a way of an example, refer to GPS technology though what will be described hereinafter can be applied to other navigation satellite systems. When the receiving apparatus 100 is operating, the antenna 1 receives a plurality of signals from one or more satellites S1-SN of the satellite constellation operating in the 1000 system. For example, these signals are modulated on a 1.5 GHz carrier. Specifically each received signal carries first and second messages.

The first message carries a pseudo-random code, known as CA code, for example at 1 MHz, which is used to differentiate one satellite from another and which allows to measure the time when the signal was transmitted by the corresponding satellite.

The second message carries data (for example at a bit rate of 50 Hz) and in particular it is modulated according to the Bi-Phase Shift Keying technique (BPSK). Moreover the second message is hierarchically divided into frames and sub-frames and carries various information among which a plurality of parameters to be used in determining the orbit and therefore the position of the satellite responsible for first and second message transmission.

The radio frequency stage 2 operates on the signals received at the antenna 1 (analog type) converting them in base band. Converter 3 converts the analog base band signals into corresponding digital signals. The acquisition module 4 allows detecting, based on the digital output signals from the converter 3, which satellites in the S1-SN constellation are in sight, that is, for which satellites a signal suitable for identification is received.

Further the acquisition module 4 detects a plurality of parameters associated with the satellites and useful for their tracking over time. The tracking module 5 has several channels, each allocating the signal of a different satellite.

Moreover, for each satellite and at any moment, in the tracking module 4, the Doppler frequency and the transmission length are computed and the bits of the second message carrying data are derived. The sub-frame identification module 6 decodes the various sub-frames of the second message of each received satellite by means of suitable algorithms. The ephemeris and pseudo-range module 7 stores the orbit for each satellite (ephemeris) and computes the distances between the satellites and the receiver 100 (such distance is called pseudo-range). From these computed values and through the transmission time, the satellite position computing module 9 computes the positions, expressed in 3D coordinates, of the satellites at the time of transmission.

In this connection, the satellite position computing module 9 operates based on transmission time together with the receiving time (known by a clock inside the receiving apparatus 100) so as to evaluate how long the signal from each satellite took to reach the receiving apparatus 100 and thus evaluating the distance of the respective satellite (pseudo-range).

By means of a triangulation algorithm, the user's position computing module 10 computes the position of the receiving apparatus 100, the distances of the receiving apparatus 100 from, preferably, at least four satellites and the positions of such satellites being known. Herein below the position of the receiving apparatus 100 (substantially coincident with the user's position) will be called "fix" according to the technical field.

Figure 2:
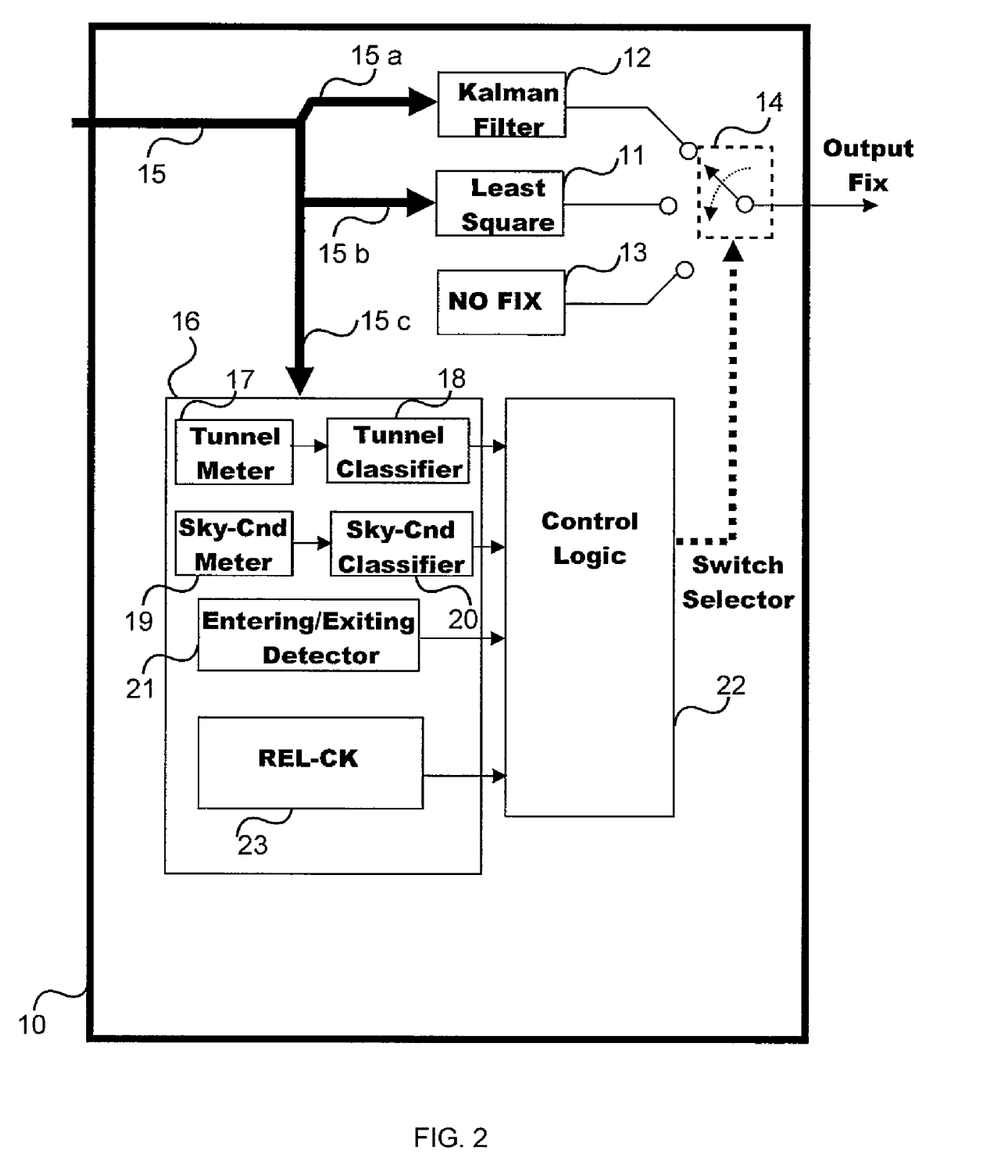
FIG. 2 schematically illustrates a position computing module which can be employed in said receiving apparatus.

FIG. 2, through functional blocks, shows the user's position computing module 10 according to a preferred embodiment. Among other possible solutions, the user's position computing module 10 is capable of managing the operation of the receiving apparatus 100 in the event of passing through a "dark region" or "darkness". A dark region is region in which the receiver apparatus 100 cannot compute the receiver position due to non-visibility of a sufficient number of satellites.

Some examples of dark regions are tunnels or galleries. What follows particularly refers to tunnels inside which sufficient satellite signals are not received. On exiting the tunnel, the receiving apparatus 100 is capable of affording the problems connected to the computation of the first fix, as will be seen in detail further on.

More specifically, the user's position computing module 10, which can be a software module, comprises a first fix computation module 11 and a second fix computing module 12. According to the example described, the first module 11 is such to perform an algorithm to compute fix in start-up conditions, that is when the receiving apparatus 100 is turned on, or when for any reason, the content of the memory related to the fix computing software from position values or other quantities previously computed is reset. According to a preferred example, the computing procedure used in the first module 11 is the Least Square algorithm (known to one skilled in the art) which is a one-shot algorithm, that is an algorithm which computes the position of the receiving apparatus 100 using a single set of instant measures with no other information or data related to previous times. As an alternative to the Least Square algorithm, the Weighted Least Square algorithm can be employed.

According to the example described, the second module 12 is such to evaluate the fix of the receiving apparatus 100 in a current instant based on a combination of status variables (i.e., quantities connected to measures previously carried out) stored along with those measured at the current instant. These status variables refer to the positions of the receiving apparatus 100 or to their combination with other parameters (for example the speed of the receiving apparatus 100). According to a preferred embodiment, the second module 12 is a Kalman filter.

Kalman filter 12, known by one skilled in the art, is based on an internal memory which registers such status variables and computes the current position by a weighted linear combination. Particularly, the Kalman filter performs a weighted linear combination between a first term corresponding to the position extrapolation based only on the prior knowledge and a second term which is the computed position based only on the current measures (the latest measures in chronological order) without taking into account past events.

Statistically speaking, Kalman filter 12 determines instant by instant the best linear combination according to the least root-mean-square error. It should be noted that the Kalman filter operates starting from at least one past measure and that's why, according to the known art, it is not used at the receiving apparatus start up or in any other situation when the receiving apparatus status is thought to be reset.

In FIG. 2 arrows 15 and 15a-15c indicates data and information to be provided to the user's position computing module 10 such as satellites positions, satellites speeds, and/or satellites received powers.

Token block 13 (NO FIX) represents a waiting status in which advantageously the position computing module 10 can be brought and where the output of fix computed is not available. Moreover, in FIG. 2 another token block 14 represents the possibility of selecting the waiting status (waiting block 13), the fix computing by means of first module 11 or second module 12.

The user's position computing module 10 further comprises a classifier and detecting module 16 which in turn comprises a tunnel duration meter module 17 (tunnel meter) associated with a tunnel classifier module (tunnel classifier) 18. The tunnel duration meter module 17 is capable of estimating the tunnel duration based on crossing time measures of the same. The tunnel classifier module 18 associates each tunnel with a category based on the duration estimated. Two categories are provided, that is a category comprising shorter duration tunnels and at least another category comprising longer duration tunnels.

The classifier and detecting module 16 further comprises a satellite visibility meter module (Sky_Cnd Meter) 19 associated with a visibility classifier module (Sky_Cnd Classifier) 20. The visibility meter module 19 is adapted to measure the receiving conditions of the signals transmitted by satellites S1-SN in a region at the tunnel exit. The expression "satellite visibility" means a satellite reception measure at the receiving apparatus 100.

The visibility classifier module 20 associates measured values, representing the satellite reception conditions (as an example, in a specific region at the tunnel exit), with respective classes. At least two classes are provided: a class comprising those lower visibility regions and at least another class comprising higher visibility regions.

Moreover classifier and detecting module 16 comprises an entering/exiting detecting module 21 (Entering/Exiting Detector) capable of detecting when the receiving apparatus 100 has passed through and come out of the tunnel.

The user's position computing module 10 is further provided with a control module 22 (Control Logic) in which a control logic is implemented. Based on the outputs of classifier and detecting module 16, the control module 22 operates a selection (acting on the token block 14) between the waiting status (waiting block 13), the fix calculation by means of first module 11 or by means of second module 12. The output fix will be available at the output of the user's position computing module 10.

It is to be noted that the user's position computing module 10 can be implemented, for example, by integrating electronic components capable of performing the calculations and the decision logic on a silicon chip.

Figure 3:
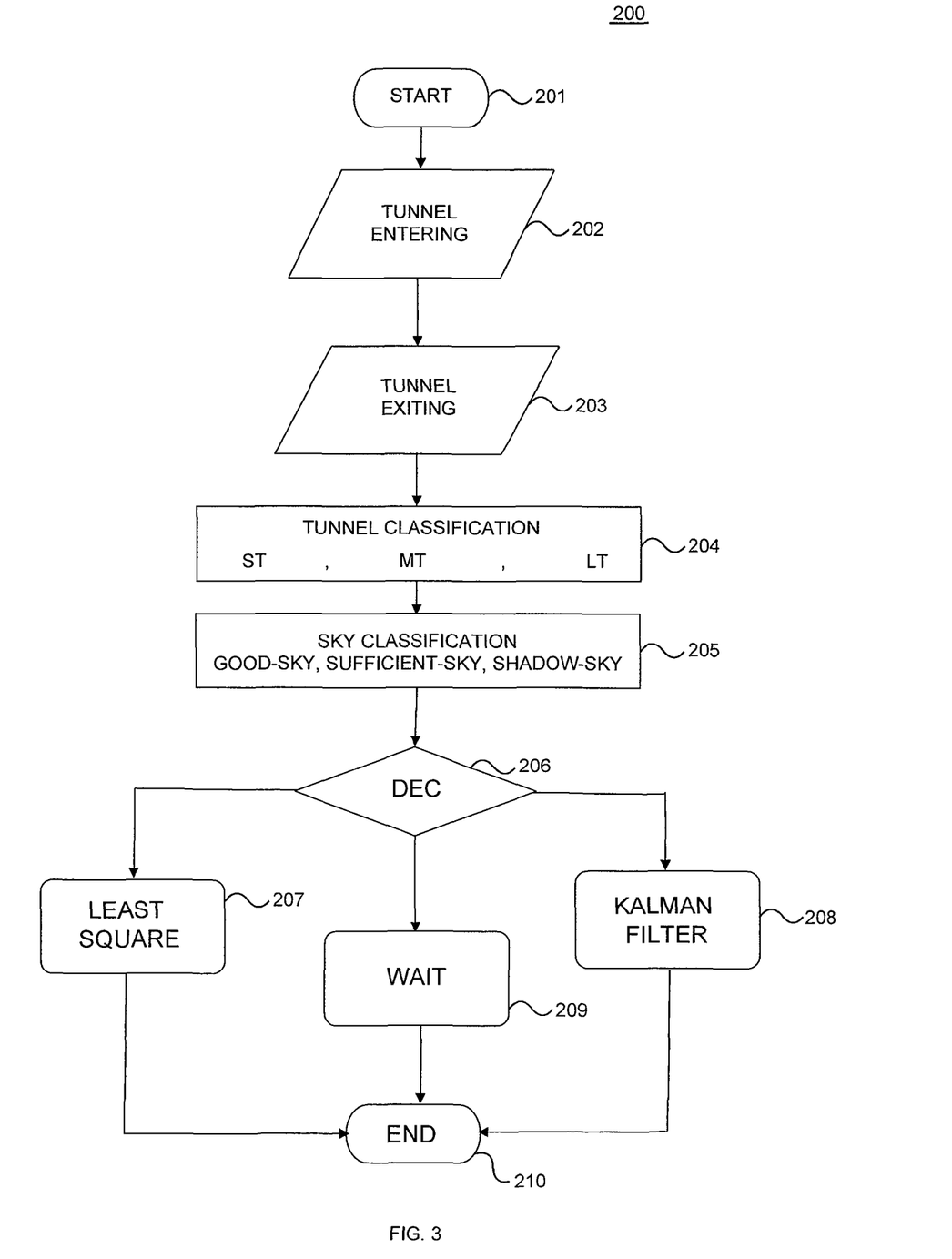
FIG. 3 is an example of a position computing method.

FIG. 3 is a flowchart of a first embodiment of an operating method 200 of the user's position computing module 10. The operating method 200 begins with a START step 201 and finishes with an END step 210.

At a step 202 (Tunnel Entering) the receiving apparatus 100 enters a tunnel and the tunnel duration meter module 17 starts to meter the tunnel duration. In a step 203, the receiving apparatus 100 leaves the tunnel and enters a visibility region. According to the example, the tunnel entering and exiting are detected by the entering/exiting detecting module 21.

In the visibility region, for example, (by means of the visibility meter module 19) the satellite reception status is measured.

At a step 204 (Tunnel Classification), the tunnel, whose duration has been measured, is allocated to a darkness category between at least two categories. For example the categories can be: short tunnel (ST) and long tunnel (LT) or advantageously a medium tunnel (MT) can be provided. The category allocation is performed by the tunnel classification module 18, for example. More than three darkness categories can be defined.

As a way of an example, not to be considered limitative, the short tunnel duration is lower than 10 s, the medium tunnel duration is between 11 and 20 s. The long tunnel duration is over 20 s.

In a step 205 (Sky Classification), to the visibility region, a visibility class, which is notably obtained taking into account the visibility condition measure, is allocated. The visibility class allocation is carried out, for example, by the visibility classification module 20. At least two visibility classes are provided: a good visibility class (Good_sky) and a poor visibility class (Shadow_sky). It is provided a third class, for example, a sufficient visibility class (Sufficient_sky), that is an intermediate class between a good visibility and a poor visibility class.

In a processing and decision step 206 (Dec) by combining a tunnel duration category and a visibility class, the fix computing type to be used is decided. This decision can be taken by the logic implemented by the control module 22.

Some specific examples explaining how the fix computing method decision can be taken are stated herein below.

In the case the tunnel falls into the long tunnel category LT and the visibility region falls into the good or sufficient class, the fix computing procedure based on instant measures, that is the Least Square algorithm implemented by the first module 11, for example, is applied (step 207).

According to a preferred embodiment, in the case of long tunnel LT and of a visibility region in the poor visibility class (Shadow_sky), the method provides a waiting step (WAIT) 209 (corresponding to NO FIX position in FIG. 2) in which the fix is not computed until a better visibility condition is detected, that is sufficient or good visibility, then the first module method is applied.

In the case of a short tunnel, the method based on a combination of past and stored status variables, such as for example Kalman filter algorithm which can be implemented by the second computing module 12 is still applied.

In the case of a middle tunnel MT and of a visibility region in the sufficient or good visibility class, the fix computing procedure based on instant measures (for example Least Square of first module 11) is applied (step 207).

In the case of a middle tunnel MT and of a visibility region in the poor visibility class (Shadow_sky) the method provides a waiting step 209 in which fix is not calculated. When, within a predetermined waiting time, the good or sufficient class is reached, the fix computing procedure based on instant measures (Least Square of first module 11, for example) will be applied.

In the specific situation of a middle tunnel, in which, after the predetermined waiting time, the visibility region does not reach at least the sufficient class, the fix computing according to the algorithm also based on a measures/variables combination previously taken and stored, such as for example, the Kalman filter algorithm which can be implemented by the second computing module 2, is applied.

Specific embodiments of some steps of the method 200 implementable by the position computing module 10 in FIG. 2 will be described herein below.

Figure 4:
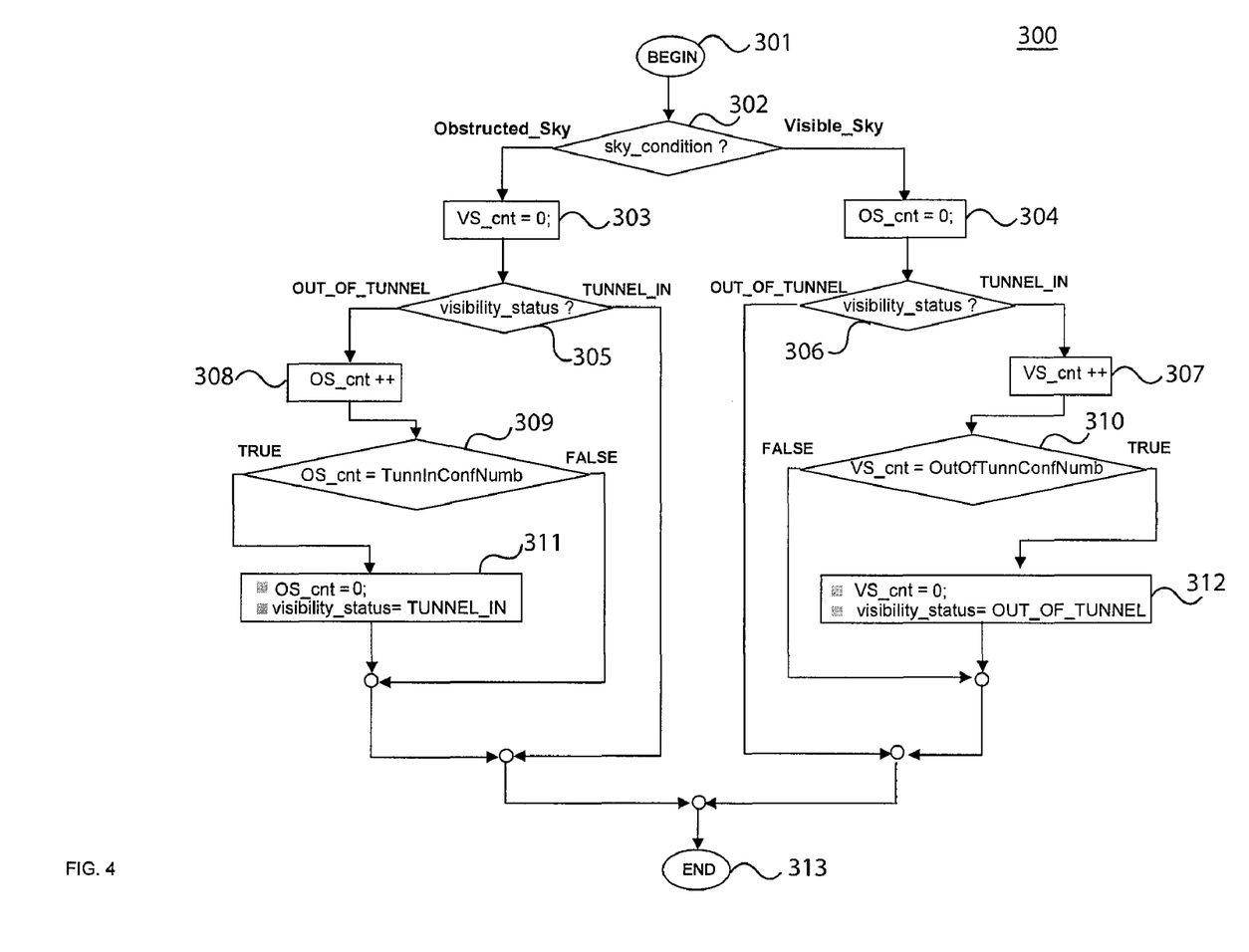
FIG. 4 is an exemplary flowchart for detecting the receiver entering a tunnel.

FIG. 4 is a flow chart referring to a method 300 to detect the entry of receiving apparatus 100 into the tunnel. This method can be carried out by the entering/exiting detecting module 21 (FIG. 2).

A state of entering the tunnel is characterized by a partial or full darkening as to signals from satellites S1-SN. Besides the starting step 301 (BEGIN) and the finishing step 313 (ND), the tunnel access evaluation method 300 comprises a sky condition evaluation step 302 (sky_condition ?) which allows to distinguish two complementary situations: an "obstructed sky" (i.e., no visibility) condition (Obstructed_sky) and a visible sky condition (Visible_sky) which defines a condition of actual sky visibility (partial or total visibility) as opposed to the obstructed sky condition. In logical terms, Visible_sky=NOT(obstructed_sky).

The Obstructed_sky condition is the condition in which the visible satellite number is low and the corresponding measured powers CN0j are low indicating a strong/very strong attenuation; for example the test carried out at step 302 is:

Cnd1: $n\_visible\_sat \leq 1$ OR

Cnd2: $n\_visible\_sat == 2$ & $\forall CN0i \leq 36$ OR

Cnd3: $n\_visible\_sat == 3$ & $\forall CN0i < 28$

Where n_visible_sat represents the visible satellite number and CN0j represents the measured power (expressed in db) of the signal received by the $J^{th}$ satellite. The 36 and 28 db values above stated are exemplary. Typically in visibility conditions, the power measured is about 40-50 db.

A first count quantity OS_cnt (303), which increases each time an Obstructed_sky condition is detected, and a second count quantity VS_cnt (304), which increases each time the complementary condition is detected, are provided.

Let's consider the case in which at step 302 the test has detected an Obstructed_sky condition. In a first monitoring step of the previous status 305 (visibility_status) the previous status is estimated. If the previous status suggests a status outside the tunnel OUT_OF_TUNNEL, the fist count quantity OS_cnt is increased by 1 (increasing step 308) because in the sky condition evaluation step 302 (Sky_condition?) an obstructed sky condition has been detected.

At a first decision step 309, comparison is made between the first count quantity OS_cnt and a predetermined quantity TunnInConfNumber (greater or equal to 1:>=1). The tunnel entering status TUNNEL_IN is stated (step 311) when the obstructed_sky condition is checked for determined number of consecutive fixes, that is OS_cnt (TunnInConfNumber).

OUT_OF_TUNNEL status is stated (step 312) when Visible_sky condition being in the TUNNEL_IN status (according to a second monitoring step 306) resulted from step 302 (with a consequent increase in the second quantity VS_cnt in step 307) is checked for a predetermined consecutive fix number (>=1) OutofTunnConfNumb (comparison step 310).

The diagram in FIG. 4 represents a state machine behavior determining the TUNNEL_IN condition or the complementary OUT_OF_TUNNEL condition.

The result of the tunnel Entering/Exiting detecting method 300 can be used by the duration meter module 17.

Figure 5:
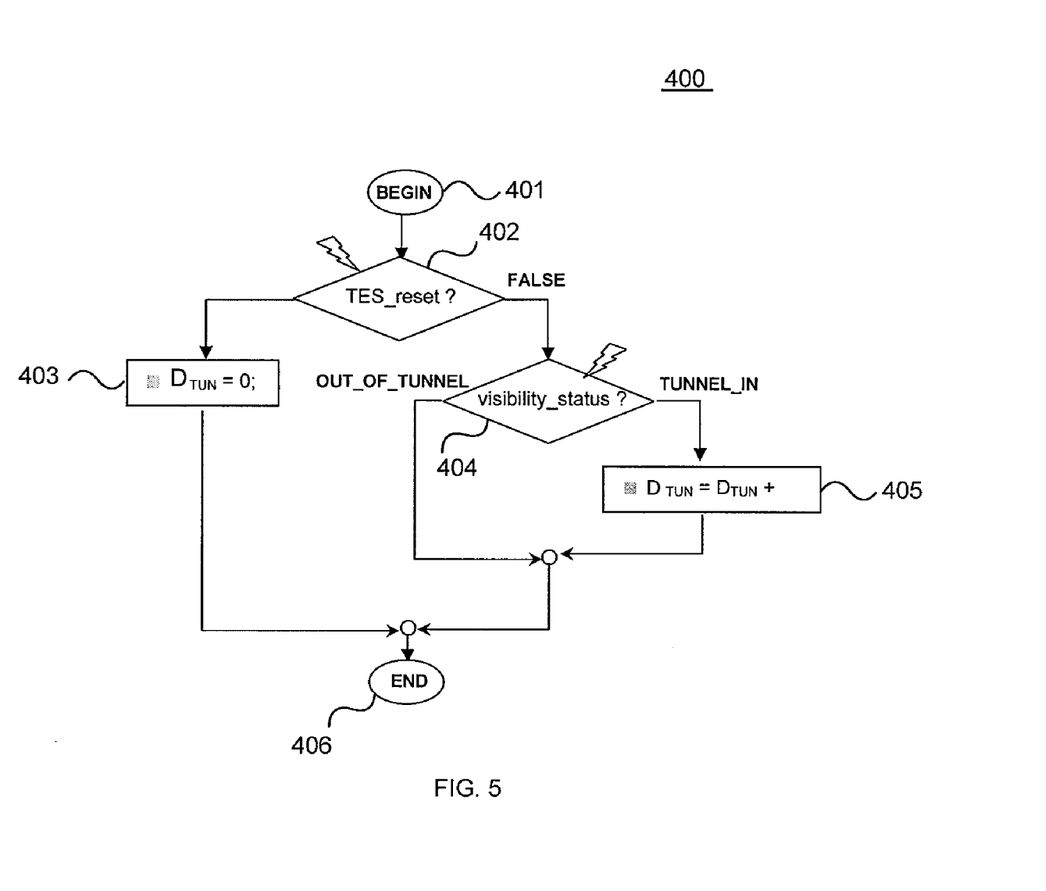
FIG. 5 shows a particular method to evaluate the tunnel duration, through a flowchart.

FIG. 5 is a flow chart of a particular method 400 to evaluate the tunnel duration. This method can be implemented by a counter counting the consecutive fix number, i.e., quantity $D_{TUN}$, where receiving apparatus 100 is in TUNNEL_IN status.

The expression "fixes number" means the number of times that the receiver apparatus 100 performs or attempts to perform the fix computing in a time interval, independently from the actual possibility of providing a computed position.

The duration evaluation method 400 comprises a reset evaluation step 402 (TES_reset?) followed by a status monitoring step 404 (visibility_status) in case reset hasn't occurred (FALSE). Should monitoring step 404 reveal a TUNNEL_IN, quantity $D_{TUN}$ representing the tunnel duration is incremented by 1 (step 405). In case of already occurred reset, the duration $D_{TUN}$ is set to 0 (step 403). The duration evaluation method 400 also includes a begin step 401 and an end step 406. Referring to tunnel classification, a plurality of threshold durations such as a first threshold $T_{SH}$, a second threshold $T_{ME}$ and a third threshold $T_{LO}$ can be defined. For example, classification step 204 (FIG. 2) can be such to define the following three classes:

Short tunnel: $D_{TUN} < T_{SH}$
Medium tunnel: $T_{SH} < D_{TUN} < T_{ME}$
Long tunnel: $D_{TUN} < T_{LO}$ Refer to visibility classification step 205 (FIG. 3). In Table 1 an exemplary visibility classification criterion and therefore reception conditions is shown.

In Table 1 the previously defined visibility classes are provided: good visibility class (Good_sky), sufficient visibility class (Sufficient_sky) and poor visibility class (Shadow_sky). Furthermore once again the darkness condition (Obstructed_sky) and the tunnel exiting condition (Tunnel_Out) are indicated.

TABLE 1

| Visibility quality | Conditions | Overall Conditions |
| --- | --- | --- |
| Obstructed_Sky | Cnd1: n_visible_sat ≤ 1<br>Cnd2: n_visible_sat==2 AND ∀CN0i ≤ 36<br>Cn3: n_visible_sat==3 AND ∀CN0i ≤ 28 | Cnd1 OR Cnd2 OR Cnd3 |
| Tunnel_Out | Cnd1: n_visible_sat >= 3<br>Cnd2: ∃ CN0i >= 36<br>Cnd3: ∃ CN0j >= 40 | Cnd1 AND Cnd2 AND Cnd3 |
| Sufficient_Sky | ∃ a subset of nUsableSats such that<br>Cnd1: nUsableSats >= 5<br>Cnd2: HDOP <= 4, VDOP <= 8, PDOP <= 9<br>Cnd3: ∀CN0i >= 29 i∈[1...nUsableSats]<br>Cnd4: Mean(CN0i) >= 36 | Cnd1 AND Cnd2 AND Cnd3 AND Cnd4 |
| Good_Sky | ∃ a subset of nUsableSats such that<br>Cnd1: nUsableSats >= 5<br>Cnd2: HDOP <= 4, VDOP <= 8, PDOP <= 9<br>Cnd3: ∀CN0$_j$ >= 36 i∈[1..nUsableSats]<br>Cnd4: Mean(CN0$_j$) >= 39 | Cnd1 AND Cnd2 AND Cnd3 AND Cnd4 |
| Shadow_Sky | | (Obstructed_Sky) < Shadow_Sky < Tunnel_Out |

N_visible_sat and $CN_0i$ (in db) quantities have already been defined. To define sufficient visibility class, the criterion utilized verifies the existence (∃) of a subgroup of at least a predetermined number of useful satellites (nUsableSats) for which the above stated conditions are verified.

The conditions to be verified for the sufficient visibility class allocation are, for instance, based on horizontal dilution of precision (HDOP), vertical DOP and position DOP parameters relating to satellite shape quality and known to one skilled in the art. For the classification, also a mean operation of the measured signal powers is employed.

Poor visibility class (i.e., Shadow_sky) is allocated when the visibility conditions are better than the in-tunnel conditions (Obstructed_Sky) but are worse the Tunnel_Out conditions.

Figure 6:
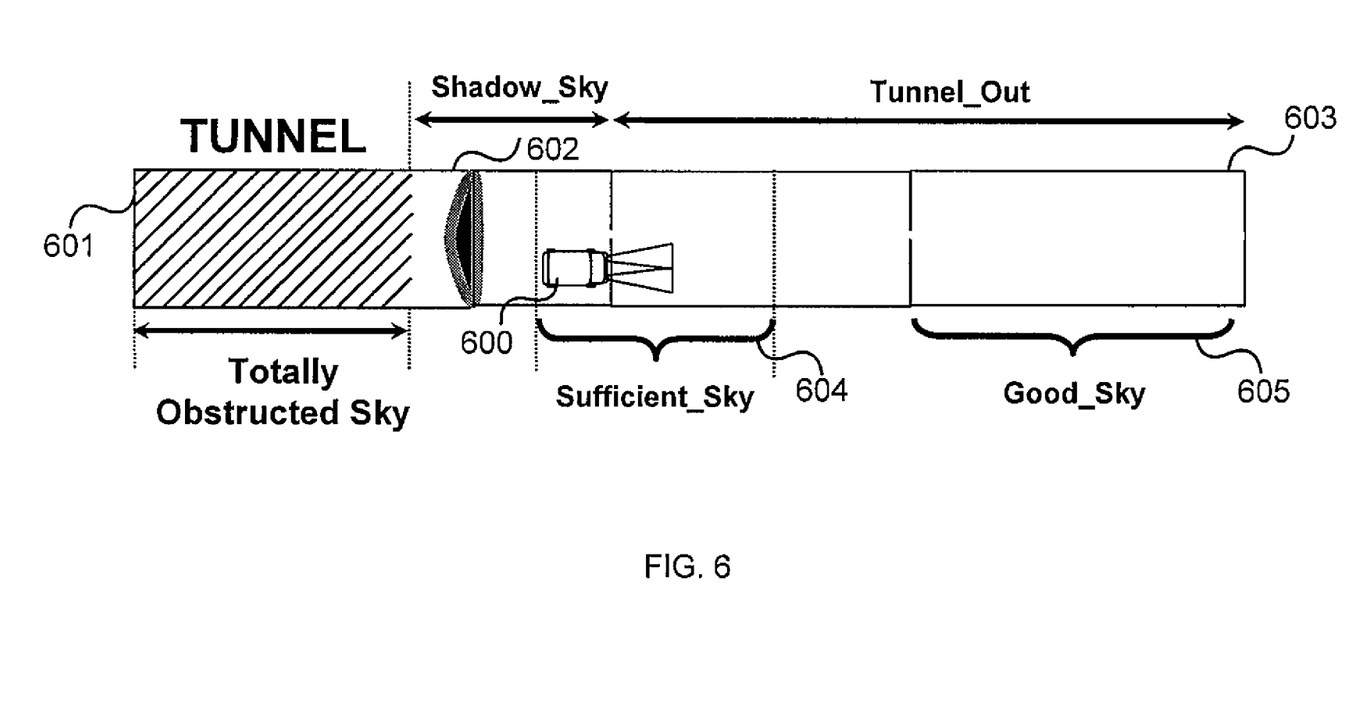
FIG. 6 schematically illustrates a possible classification of visibility regions on exiting the tunnel.

FIG. 6 is an example of the various visibility regions which can be defined by conditions stated in Table 1 and a vehicle 600 equipped with the receiving apparatus 100. FIG. 6 shows tunnel 601, poor visibility region 602 (Shadow_sky), Tunnel_Out region 603, sufficient visibility region 604 (Sufficient_sky) and good visibility region 605 (Good_sky).

Figure 7:
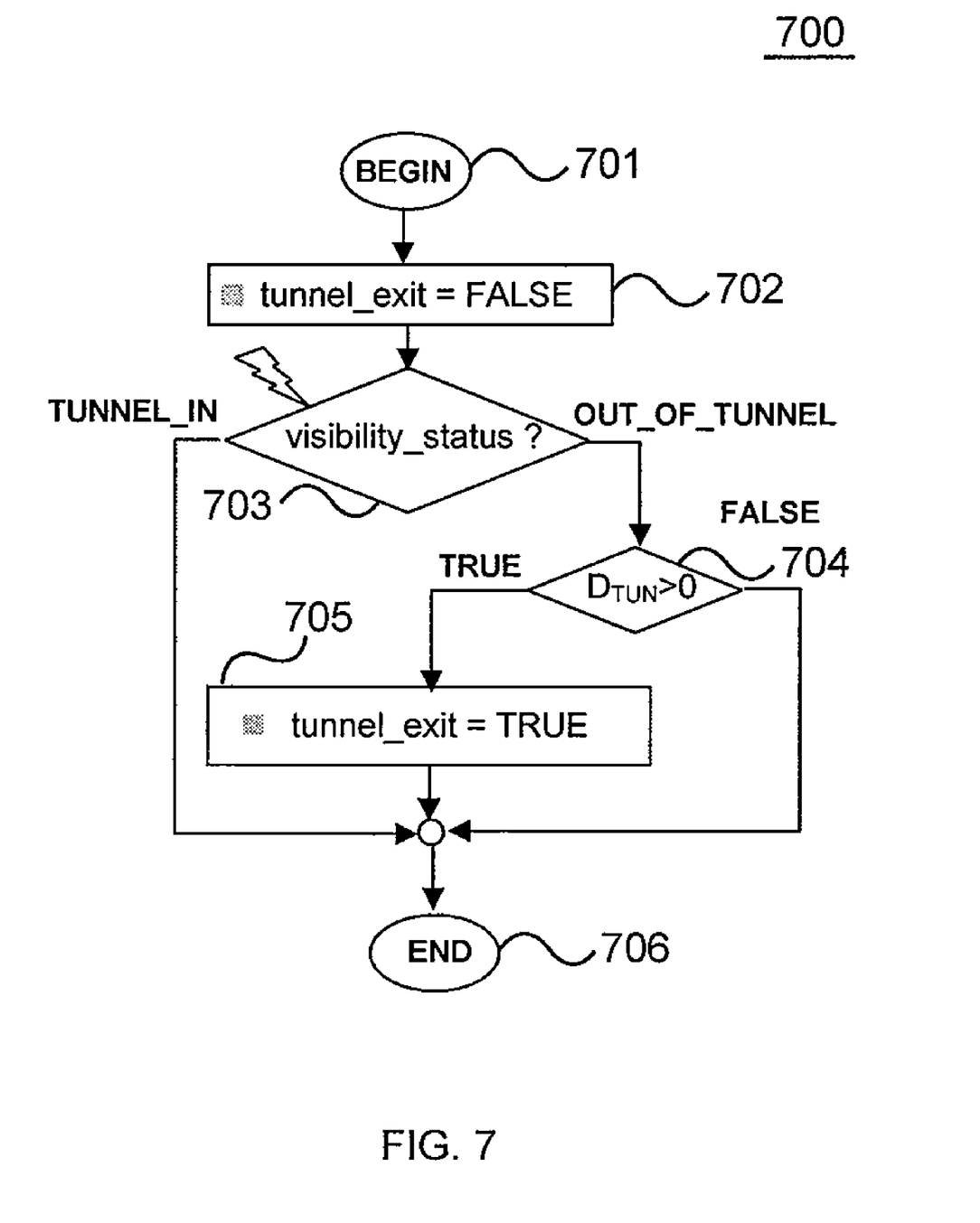
FIG. 7 shows an embodiment of a method of detecting the exiting of the tunnel.

FIG. 7 is an embodiment of a tunnel exit detecting method 700 which can be implemented by the entering/exiting detecting module 21 (FIG. 2). Besides a starting step (BEGIN) and an end step 706 (END), the method provides a first declaration step 702 in which a variable representative of the tunnel exit (tunnel_exit) is declared false. In a monitoring step 703, it is verified if the visibility condition is the one on entering the tunnel (TUNNEL_IN) or that on exiting the tunnel (OUT_OF_TUNNEL), by reading the results of the described method with reference to FIG. 4. If a OUT_OF_TUNNEL visibility condition occurs and the tunnel duration is different from zero $D_{TUN} > 0$, (check step 704), then in a second declaration step 705, it is declared that tunnel_exit variable is true.

Now, for example, refer to selection logic of the fix computing mode, implementable by control module 22. This selection logic is applied in a tunnel exiting condition defined by OUT_OF_TUNNEL and $D_{TUN} > 0$.

With reference to the processing and decision step 206 shown in FIG. 3, examples of the criterion used for selecting fix computing methods in the cases of short tunnel, medium tunnel and long tunnel in the different visibility conditions defined in Table 1 are described.

Short Tunnel

In case of short tunnel, apart from visibility conditions, the selection logic is completely reset and the first fix at the exit by means of Kalman filter is performed.

Medium Tunnel

Figure 8:
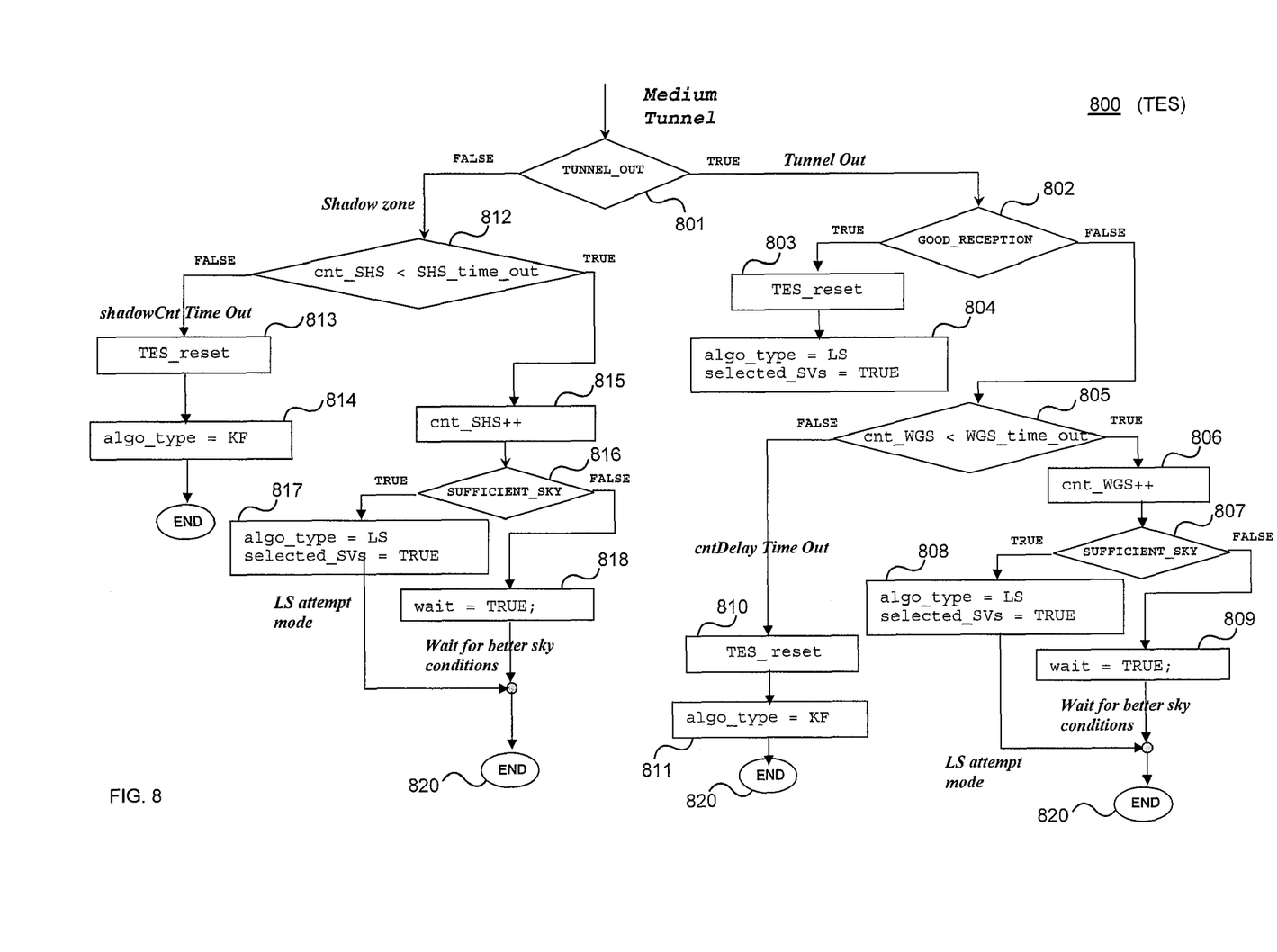
FIG. 8 is a flowchart showing a particular selection procedure of the position computing method in the case of a middle tunnel.

With reference to FIG. 8, in a flowchart a specific selection managing method 800 (TES, Tunnel Exit Strategy) is represented. LS refers to the Least Square algorithm while KF represents Kalman filter application. The variable algo_type (LS or KF) states the algorithm choice. The variable selected_$SV_s$ (TRUE or FALSE) is a variable indicating to the first module 11 (Least Square, FIG. 2) that data received from a selected satellites subgroup is to be used. The selected satellites satisfy the Good_Sky conditions or the Sufficient_Sky conditions. In a Tunnel_Out condition (801) in a Good_Sky reception type (802, TRUE) the whole logic is reset (TES_reset, 803) and the Least Square algorithm is applied directly, that is step 804 where algo_type=LS, and the variable selected_$SV_s$ (TRUE) indicates the satellites to be used.

On the other hand, in a Tunnel_Out condition but not in a Good_Sky condition (802, FALSE) the flow chart passes to a waiting state. In the waiting state, within a predetermined maximum number of consecutive fixes (WGS_time_out), Good_Sky condition is waited to be reached. To this end, by means of a specific counter, a number of wait fixes cnt_WGS is considered. When number cnt_WGS reaches the maximum number WGS_time_out (805, FALSE), the waiting state ends, the whole selection logic (810) is reset and the first fix by means of Kalman filter is performed (811).

If number cnt_WGS is lower than maximum number WGS_time_out (805, TRUE), first number cnt_WGS (806) is increased and it is verified (807) if at least Sufficient_Sky condition is satisfied. If this latter condition is satisfied (807, TRUE) Least Square algorithm is selected (808). This Least Square algorithm selection is in an attempt mode. If Sufficient_Sky condition (807, FALSE) is not reached, NO_FIX is output and the wait gets longer (809).

Alternatively, if a Tunnel_Out state (801, FALSE) does not occur, it occurs the poor visibility condition, that is Shadow_Sky condition. In this condition, the flow chart passes to the waiting state and, within a predetermined consecutive maximum fix number SHS_time out, it waits for Good_Sky condition to be reached. To this end a specific counter, counting the fix number cnt_SHS is incremented. When cnt_SHS is greater or equal to the maximum number SHS_time_out (812, FALSE) the wait ends, the whole selection logic (813) is reset and the first fix is carried out by Kalman filter (814).

On the other hand, if number cnt_SHS is lower than the maximum number SHS_time_out (812, TRUE), number cnt_SHS is incremented (815) and it is checked if at least Sufficient_Sky condition is satisfied (816). If this later condition is satisfied (816, TRUE), the Least Square algorithm is selected (817), in an attempt mode, otherwise a NO_FIX is output (818) and waiting gets longer. The end steps are indicated by the referral number 820, in FIG. 8.

Long Tunnel

Figure 9:
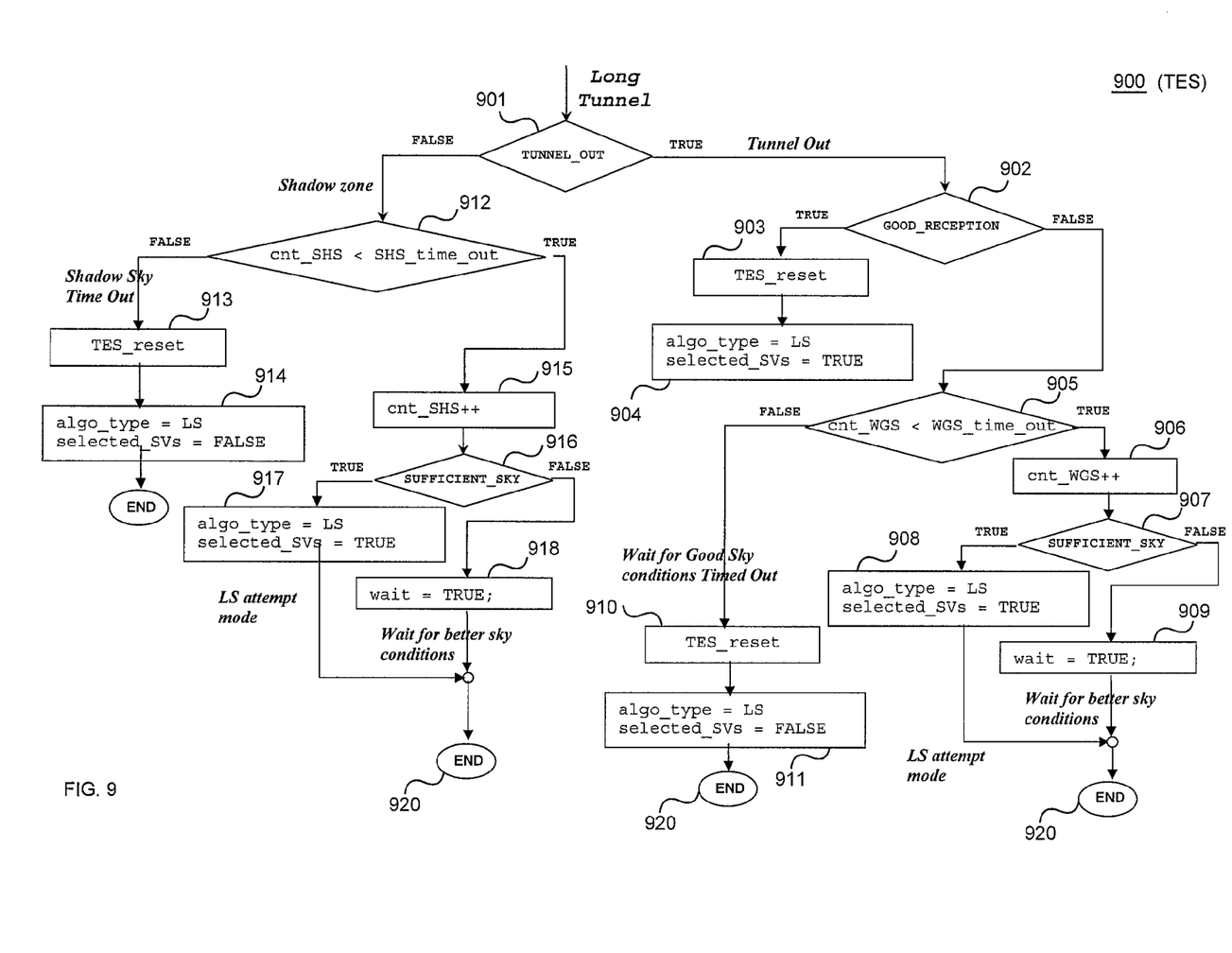
FIG. 9 is a flowchart showing a particular selection procedure of the position computing method in the case of a long tunnel.

FIG. 9 is a flowchart 900 relating to long tunnel selection logic (Tunnel Exit Strategy, TES). In FIG. 9 the same symbols defined in FIG. 8 are applied.

In a condition of TUNNEL_OUT (901, TRUE) and in Good_Sky (902, TRUE) selection logic (903) is reset and the Least Square algorithm is applied (904).

In TUNNEL_OUT and visibility conditions worse than Good_Sky (902, FALSE), the flowchart passes to a waiting state for Good_Sky condition to be reached and fix number counting, cnt_wgs is performed. If number cnt_wgs is greater or equal to the maximum number WGS_time_out (905, FALSE), then the selection logic is reset (910) and the first fix is performed by means of the Least Square algorithm (911). In step 911 the variable selected_$SV_s$ is FALSE since the condition reached does not allow to use a subgroup of selected satellites. The control module 22 sends a command signal to the first module 11 so as to perform the Least Square algorithm using all the detected satellites.

On the other hand if number cnt_WGS is lower than maximum number WGS_time_out (905, TRUE) then first count variable cnt_WGS is incremented (906) and the flow chart verifies if at least Sufficient_Sky condition is satisfied (907). If the latter condition is satisfied (907, TRUE), the Least Square algorithm is selected in attempt mode (908) otherwise (907, FALSE) a NO_FIX is output and the flowchart keeps waiting (909).

Alternatively, if the condition is not Tunnel_Out condition (901, FALSE), then it is the complementary condition called Shadow_Sky. In the waiting state a consecutive fix number cnt_SHS is counted and within a predetermined maximum consecutive fix number SHS_time_out the flowchart waits for Good_Sky condition to be reached.

When number cnt_SHS is greater or equal to the maximum number SHS_time_out (912, FALSE) then waiting ends, the whole selection logic is reset_(913) and the first fix by the Least Square algorithm is performed (914). But if fix number cnt_SHS is lower than the maximum number SHS_time_out (912, TRUE) then first number cnt_SHS is incremented (915) and it is verified if at least Sufficient_Sky condition is satisfied (916).

If this latter condition is satisfied (916, TRUE) the Least Square algorithm is selected (917) in attempt mode otherwise a NO_FIX is output and waiting goes on (918). In FIG. 9 end steps are indicated by the reference number 920.

According to another embodiment, the position computing based on the Least Square algorithm can be also based on a "virtual satellite". "Virtual satellite" [VS] means an imaginary transmitter at the centre of the earth, that is where the reference system ECEF (for Earth-Centered, Earth-Fixed), per se known to the ones skilled in the art.

In order to measure its range, that is its distance from the receiving apparatus 100, the planet radius is added to sea-level height where the apparatus itself is located. The virtual satellite sends no real signals, therefore it cannot provide any frequency measure. Consequently the use of a satellite as a measure improves the position calculation. As for velocity, which in a GNSS receiver is calculated by processing Doppler deviations of received signals compared with the nominal carrier, the virtual satellite provides no contribution.

In order to calculate the virtual satellite range, it is known the height at which the receiving apparatus 100 is located, however also the receiving apparatus latitude and longitude need to be computed. Height is therefore an unknown. In practice, height (h) computed in a previous instant is used, assuming that:

Such height (h) has been correctly computed, being therefore reliable;

The instant when height (h) was computed is not too remote from the instant when the virtual satellite will be used;

The slope of the path followed by the user having the receiving apparatus 100 is within reasonable limits readily defined by one skilled in the art.

When exiting the tunnel the height h computed on the last fix before entering will be available.

Moreover the position computing module 10 is provided with a reliability computing module 23 (e.g., a software operating as a state machine) which assesses the suitability of such evaluation and therefore the virtual satellite integrity.

Preferably this reliability evaluation is performed considering the history of a predetermined n number of fixes (e.g., 15) computed before entering the tunnel.

Particularly, some of the characteristics this fix-series should exhibit so that the height of the last fix can be considered reliable might be as follows:

Sky visibility and satellite signal reception sufficiently good so as to ensure that the computing of the position and consequently of the height is always feasible in each of these instants.

The virtual satellite has not yet been used in any instant of the series taken into consideration (that is height has always been computed in its respective fix and never derived from the previous one).

In each fix the Kalman filter prediction errors (the so called residuals, well known to those skilled in the art) fall within statistically acceptable limits.

Once ascertained that such basic conditions have been respected, a quantitative analysis of the height value series can be carried out so as to determine whether the last one is reliable. A first useful criterion can be to assess that the computed height statistical dispersion remains within a determined range.

A further more specific processing can be added by identifying a fitting curve for the height series and determining a maximum deviation between the value assumed by this curve on entering the tunnel itself.

It is to be noted that the preferred use of a virtual satellite may be advantageous in terms of accuracy. In fact, the position computation accuracy, particularly when performed by means of Least Square algorithm is highly influenced by the number of (satellite) measures available. In particular the minimum number of satellites for this last computation is typically 4; however this number is usually far from assuring a reliable fix; errors in the range of dozens of meters are frequent. However if the list includes corrupted measures (typically caused by reflected or noisy signals) the error can be in the range of hundreds of meters.

On the other hand, the higher the measure redundancy is, the more reliable also a position computed by means of Kalman filter is.

As already mentioned, this algorithm first transfers the past position into the future providing then a correction using the present measures. It is apparent that a higher number of measures available improves such correction making up for inaccuracies due both to extrapolation uncertainty and the presence of noisy measures.

It should be pointed out that a good exiting from a tunnel is typically the result of a compromise between TTFF (Time to First Fix) and accuracy. Having the measure depending on the virtual satellite in extreme conditions (e.g., when a fix is to be Least Square algorithm and only three satellites—though reliable—being available) may help in quickly reaching the condition necessary to calculate the exiting fix.

Through experimental tests, the Applicants have found that the employment of the above described teachings (i.e., FIG. 3) makes the position computing managing on exiting the tunnel particularly accurate and efficient.

The position computing on exiting the tunnel has been carried out by making use of a conventional technique based on a receiver performing the fix computing every second. According to this technique, at (medium length) tunnel exit, the conventional receiver has made use of four available satellites and has computed a fix by means of Kalman filter method. As to the actual receiver position, an error of about 180 m has been found.

In the same conditions, the described method has been employed with reference to FIGS. 3-8; as soon as the receiver left the tunnel it entered a waiting state (NO FIX), then after an interval of 1 s, it computed fix by means of the Least Square algorithm making it available at the exit. A waiting time of just 1 s has allowed six satellites, not only four, to be available to compute the fix. The position so obtained showed no relevant errors. Further experimental tests proved the reliability and accuracy of the method for different types of tunnels and different visibility conditions at the tunnel exit.

While this detailed description has set forth some embodiments, the appended claims cover other embodiments which differ from the described embodiments according to various modifications and improvements.

The invention claimed is:

1. A method, comprising:
bringing a satellite receiver into a dark region of a satellite system;
bringing the receiver into a visible region of the satellite system outside the dark region;
allocating to the dark region a darkness category chosen between at least two categories based on a dark region crossing time at which the receiver crosses between the dark region and the visible region;
allocating a visibility class, chosen between at least two distinct classes, to the visibility region;
selecting one of a first and a second method of computing the receiver position, the selecting being based on the class and the category allocated; and
computing the receiver position using the selected method, the allocating the darkness category, the allocating the visibility class, the selecting and the computing being performed by one or more configured devices.

2. The method according to claim 1, further comprising:
deciding, according to said allocated category and class, to wait before using the selected method.

3. The method according to claim 1, in which the first method of computing the receiver position comprises:
carrying out satellite measures in a current time;
computing the receiver position based on said measures independently from position values computed before said current time.

4. The method according to claim 3, in which said first method of computing the receiver position is a least square method.

5. The method according to claim 3, in which said second method of computing the receiver position comprises:
   carrying out satellite measures in a first time;
   retrieving at least one status variable of the receiver recorded before said first time; and
   estimating the receiver position based on a combination of said measures carried out in the first time and said at least one status variable retrieved.

6. The method according to claim 5, in which said second method of computing the receiver position includes using a Kalman filter.

7. The method according to claim 5, in which allocating a darkness category to the darkness region includes:
   defining a first category to which a first group of travelling times is correlated;
   defining a second category to which a second group of travelling times greater than the first group is correlated; and
   defining a third category to which a third group of travelling times greater than the second group is correlated.

8. The method according to claim 1, in which said darkness region belongs to a group consisting of tunnels and galleries.

9. The method according to claim 1, further comprising:
   detecting an entry of the receiver in the dark region; and
   detecting an exit of the receiver from the dark region and its entry into the visibility region.

10. The method according to claim 9, in which detecting the dark region/entry and exit comprises:
    counting a number of visible satellites from which the receiver is receiving respective electromagnetic signals;
    evaluating a power related to each electromagnetic signal received;
    combining said counted number and said power evaluated; and
    deciding if the receiver entered to or exited from the dark region according to said combining.

11. The method according to claim 1, in which allocating the visibility class to the visibility region comprises defining visibility conditions of at least one satellite.

12. The method according to claim 11, in which defining visibility conditions comprises:
    counting a number of visible satellites from which the receiver is receiving respective electromagnetic signals; and
    evaluating a power related to each electromagnetic signal received.

13. The method according to claim 11, in which defining a visibility condition further comprises considering dilution of precision parameters.

14. The method according to claim 11, in which allocating the visibility class to the visibility region comprises:
    defining a first class with which a first visibility condition is associated;
    defining a second class with which a second visibility condition better than the first visibility condition is associated; and
    defining a third class with which a third visibility condition better than the second visibility condition is associated.

15. The method according to claim 14, further comprising:
    deciding, according to said allocated category and class, to wait before applying the selected method of computing the receiver position; and
    waiting until detecting a visibility region belonging to the second or third class;
    wherein said waiting is ended upon reaching a threshold time interval.

16. The method according to claim 15, in which allocating a darkness category to the darkness region includes:
    defining a first category to which a first group of travelling times is correlated;
    defining a second category to which a second group of travelling times greater than the first group is correlated; and
    defining a third category to which a third group of travelling times greater than the second group is correlated, and in which selecting one of the first and second methods of computing the receiver position comprises:
    selecting said first method of computing the receiver position in case of a darkness region belonging to said third category and in case of a visibility region belonging to one of the second and third classes.

17. The method according to claim 15, in which allocating a darkness category to the darkness region includes:
    defining a first category to which a first group of travelling times is correlated;
    defining a second category to which a second group of travelling times greater than the first group is correlated; and
    defining a third category to which a third group of travelling times greater than the second group is correlated, and in which selecting one of the first and second methods of computing the receiver position comprises:
    in case of a dark region belonging to said second category:
       selecting said first method of computing the receiver position when a visibility region belongs to one of the second and third classes; and
    selecting the second method of computing the receiver position when a visibility region belongs to the first class.

18. The method according to claim 15, in which allocating a darkness category to the darkness region includes:
    defining a first category to which a first group of travelling times is correlated;
    defining a second category to which a second group of travelling times greater than the first group is correlated; and
    defining a third category to which a third group of travelling times greater than the second group is correlated, and in which selecting one of the first and second methods of computing the receiver position comprises:
    selecting the second method of computing the receiver position in case of a dark region belonging to said first category.

19. The method according to claim 1, in which said first method of computing the receiver position further comprises:
    considering a virtual earth-centered satellite for computing the position of the receiver.

20. The method according to claim 1, in which said first method of computing the receiver position further comprises employing fault determination.

21. A device, comprising:
    a detecting module structured to detect a receiver entering a dark region of a satellite system and exiting the dark region towards a visibility region of the satellite system;
    a first allocation module structured to allocate to the dark region a darkness category chosen between at least two categories based on a dark region crossing time;
    a second allocation module structured to allocate to the visibility region a visibility class chosen between at least two classes;

a selection module structured to select, based on the category and the class allocated, one of a first and a second method of computing the receiver position; and a position calculation module configured to determine the receiver position based on a selection by the selection module of one of the first and second methods of computing the receiver position.

22. The device according to claim 21 wherein the position calculation module comprises a first computing module configured to carry out the first method of computing receiver position and a second computing module configured to carry out the second method of computing receiver position; the first and second computing modules being selectable by the selection module to compute a position of the receiver.

23. The device according to claim 22, in which, based on said category and class allocated, said selection module is configured to bring the computing module into a wait state before selecting the first or the second computing module.

24. A receiving apparatus, comprising:
a receiving module configured to receive signals from satellites operating in a satellite navigation system;
a processing module configured to process signals from the receiving module;
a module configured to detect the receiving apparatus entering a dark region of the satellite system and exiting the dark region towards a visibility region of the satellite system;
a first allocating module configured to allocate to the dark region a darkness category, chosen between at least two categories based on a dark region crossing time;
a second allocating module configured to allocate to the visibility region a visibility class, chosen between at least two classes;
first and second computing modules configured to carry out first and second apparatus position computing methods, respectively; and
a selection module configured to select one of the first and the second position computing methods based on the category and the class allocated.

25. The apparatus according to claim 24, in which, based on said category and class allocated, said selection module is configured to bring the first and the second computing modules into a wait state before selecting the first or the second computing module.

26. A satellite system, comprising:
a plurality of satellites configured to transmit positioning signals;
a receiving apparatus comprising:
a receiving module configured to receive the signals from the satellites;
a processing module configured to process signals from the receiving module;
a module configured to detect the receiving apparatus entering a dark region of the satellite system and exiting the dark region towards a visibility region of the satellite system;
a first allocating module configured to allocate to the dark region a darkness category, chosen between at least two categories based on a dark region travelling time;
a second allocating module configured to allocate to the visibility region a visibility class, chosen between at least two classes; and
a selection module configured to select one of first and second receiver position computing methods based on the category and the class allocated; and a position calculation module configured to determine a position based on a selection by the selection module of one of the first and second receiver position computing methods.

27. The system according to claim 26 wherein the position calculation module is part of the receiving apparatus and includes a first computing module configured to carry out the first receiver position computing method and a second computing module configured to carry out the second receiver position computing method; the first and second computing modules being selectable by the selection module to compute a position of the satellite receiver.

28. The system of claim 26 wherein the module configured to detect the receiving apparatus entering and exiting the dark region comprises a state machine.

29. The method of claim 1, wherein the allocating the darkness category comprises using a state machine to detect entry into and exit from the dark region.

30. The device of claim 21, comprising a state machine configured to detect entry into and exit from dark regions.

31. The device of claim 22 wherein the second computing module is configured to:
carry out satellite measures in a first time;
retrieve at least one status variable of the receiver recorded before said first time; and
estimate the receiver position based on a combination of said measures carried out in the first time and said at least one status variable retrieved.

32. The device of claim 31 wherein the first allocation module is configured to:
define a first category to which a first group of travelling times is correlated;
define a second category to which a second group of travelling times greater than the first group is correlated; and
define a third category to which a third group of travelling times greater than the second group is correlated.

33. The device of claim 21 wherein the detecting module is configured to:
count a number of visible satellites from which the receiver is receiving respective electromagnetic signals;
evaluate a power related to each electromagnetic signal received;
combine said counted number and said power evaluated; and
decide if the receiver entered into or exited from the dark region according to said combining.

34. The device of claim 22 wherein the second allocation module is configured to:
define a first class with which a satellite first visibility condition is associated;
define a second class with which a satellite second visibility condition better than the satellite first visibility condition is associated; and
define a third class with which a satellite third visibility condition better than the second visibility condition is associated.

35. The device of claim 34 wherein the position calculation module is configured to:
calculate a receiver position applying the selected computing method;
decide, according to said allocated category and class, to wait for detection of a visibility region belonging to the second or third class, wherein said waiting is ended upon reaching a threshold time interval; and
recalculate the receiver position when a visibility region belonging to the second or third class is detected before reaching the threshold time interval.

36. The device according to claim 21 wherein the first allocation module is configured to:

define a first category to which a first group of travelling times is correlated;

define a second category to which a second group of travelling times greater than the first group is correlated; and define a third category to which a third group of travelling times greater than the second group is correlated.

37. The apparatus of claim 24 wherein the module configured to detect the receiving apparatus entering and exiting the dark region comprises a state machine.

* * * * *